UNITED STATES PATENT OFFICE.

LEANDER BUTLER, OF CHELSEA, ASSIGNOR TO HIMSELF AND ROMULUS NORWOOD, OF ROCKPORT, MASSACHUSETTS.

IMPROVEMENT IN PROCESSES FOR TREATING REFUSE MATTER CONTAINING GUMS, RESINS, &c.

Specification forming part of Letters Patent No. 176,128, dated April 18, 1876; application filed January 12, 1876.

*To all whom it may concern:*

Be it known that I, LEANDER BUTLER, of Chelsea, of the county of Suffolk and State of Massachusetts, have made a new and useful invention, having reference to the restoration for utilization of compositions used in varnishing, especially those for loom harness; and do hereby declare the same to be described as follows:

In carrying out my invention, I take a quantity—say, two hundred pounds—of old loom-harness, or that which may have become useless by wear, and put it into a kettle, and to it add water sufficiently to cover it—that is to say, about forty-five gallons. To such I add forty pounds of sal-soda, or other suitable alkali, or before putting the water to the harness I add the sal-soda or alkalies to the water. Next, the whole in the kettle is to be subjected to heat, and boiled for from three to five hours, or until the varnish composition of the harness may have been separated from the twine or body of the harness, which latter is next to be drawn out or removed from the solution.

The alkaline solution of varnish, or of copal, linseed-oil, and turpentine, as it usually is, I next subject to the action of sulphuric or other acid, sufficient in amount to neutralize the alkali of the solution. To accomplish this, about fifteen pounds of oil of vitriol may be used. This having been done, the gummy and oleaginous constituents of the varnish will generally rise and float on the liquid, which should next be drawn off or separated from them. After this the residuum is to be subjected to a strong heat, or is to be put in pans in an oven and baked as dough is usually baked for conversion of it into bread, the heat or temperature employed being about that used in baking bread, and the baking being carried on for about thirty minutes. The baked matter is next to be suffered to cool, after which it will be ready for use for various purposes in the arts, it being especially valuable in the manufacture of a dressing for leather.

The baking operation, besides evaporating much of the liquid left in the residuum, changes the color of the latter from a light to a deep or dark brown, whereby it is rendered valuable for the making of the above-mentioned dressing, and for other purposes.

I do not confine my invention to the precise proportions of acid or alkali as mentioned, as such may be somewhat varied, and still be productive of good results.

I claim—

The art or process, substantially as described, of treating loom-harness or varnished material for the purpose of separating therefrom its varnish or covering matter, and preparing such for use in the arts, such consisting in first subjecting it to an alkaline solution and heat, and next to an acid, and afterward drawing off the surplus liquid and baking the residuum in an oven, all essentially as set forth.

LEANDER BUTLER.

Witnesses:
R. H. EDDY,
J. R. SNOW.